United States Patent
Godler

(10) Patent No.: US 8,237,390 B2
(45) Date of Patent: Aug. 7, 2012

(54) DRIVE UNIT FOR LEGGED ROBOTS AND CONTROL METHOD THEREOF

(75) Inventor: Ivan Godler, Kitakyushu (JP)

(73) Assignee: Ivan Godler, Kitakyushu (JP)

( * ) Notice: Subject to any disclaimer, the term of this patent is extended or adjusted under 35 U.S.C. 154(b) by 302 days.

(21) Appl. No.: 12/705,571

(22) Filed: Feb. 13, 2010

(65) Prior Publication Data

US 2011/0199038 A1    Aug. 18, 2011

(51) Int. Cl.
*B25J 9/00* (2006.01)
(52) U.S. Cl. ........... 318/568.12; 318/568.11; 318/568.1; 318/560; 318/630; 318/632
(58) Field of Classification Search ............ 318/568.12, 318/623, 630, 632, 568.1, 568.11
See application file for complete search history.

(56) References Cited

U.S. PATENT DOCUMENTS

| | | | |
|---|---|---|---|
| 4,843,921 A * | 7/1989 | Kremer | 74/89.2 |
| 5,650,704 A * | 7/1997 | Pratt et al. | 318/623 |
| 6,243,623 B1 * | 6/2001 | Takenaka et al. | 700/245 |
| 6,505,096 B2 * | 1/2003 | Takenaka et al. | 700/245 |
| 7,278,501 B2 | 10/2007 | Mori et al. | |
| 7,441,614 B2 | 10/2008 | Takemura et al. | |
| 2009/0249903 A1 | 10/2009 | Godler | |

FOREIGN PATENT DOCUMENTS

JP    4395180 B2    10/2009

* cited by examiner

*Primary Examiner* — Walter Benson
*Assistant Examiner* — David Luo

(57) ABSTRACT

A drive unit comprising of a driving motor and of at least two flexible linking members, which twist on each other when a rotational shaft of the driving motor rotates and thus produce a pulling force on a motion element that is attached to or is a part of link of a legged robot's leg mechanism is disclosed. A control method to control the invented drive unit so that a passive, a passive-dynamic or an active walking modes and transition between the modes of a legged robot is achieved without any additional mechanical means is disclosed.

1 Claim, 5 Drawing Sheets

DRIVE UNIT FOR LEGGED ROBOTS AND CONTROL METHOD THEREOF

CROSS-REFERENCE TO RELATED APPLICATIONS

Japanese patent application: appl. (21) JP 2007-227307 (Sep. 3, 2007), pub. (11) JP 2009-56567 (Mar. 19, 2009), pat. (10) JP4372816 (Sep. 11, 2009)

BACKGROUND OF THE INVENTION (1) Field of the Invention

The present invention relates to drive units for legged robots and control method thereof. The invented drive unit powers the robot's joint by using flexible members, and the invented control method provides passive, passive-dynamic and active walking modes and transition between the modes, without using any additional physical means.

(2) Description of Related Art

In general, two main modes of walking for biped, quadruped, or other legged walking robots are known. One is passive walking and the other is active walking (for example, refer to T. McGeer, "Passive dynamic walking," Int. J. Robot. Res., Vol. 9, No. 2, pp. 62-82, April 1990). Characteristically for passive walking is that the joints of robot's legs are not powered and the robot walks passively by descending a shallow slope. This type of walking resembles what is observable in the nature, and enables walking without energy supply. Mechanical transport cost factor, which is defined as a ratio of consumed energy to the robot's weight and traveled distance is known to be less than 0.1 for passive walking (refer to S. Collins, A. Ruina, R. Tedrake, M. Wisse, "Efficient Bipedal Robots Based on Passive Dynamic Walkers," Science, Vol. 307, pp. 1082-1085, February 2005, page 1083). However, due to lack of energy supply, a sustained passive walk on a horizontal plane is impossible, additionally, due to lack of active control, the walking on an uneven surface is also impossible.

Majority of recently developed legged robots walk in a way that is described as active walking (for example U.S. Pat. No. 7,278,501, U.S. Pat. No. 7,441,614). In the disclosed patented robots, the robot's joints and the driving motors are continuously coupled and the joints are powered and controlled throughout the whole walking step cycle. The result of active walking is higher energy consumption and the total energy cost defined as a ratio of consumed energy to the robot's weight and traveled distance is 3 or higher (refer to S. Collins, A. Ruina, R. Tedrake, M. Wisse, "Efficient Bipedal Robots Based on Passive Dynamic Walkers," Science, Vol. 307, pp. 1082-1085, February 2005, page 1083), but the robots are more stable and robust when walking on an uneven terrain.

In recently published research results (Carnegie Mellon University, MIT, Delft University) it is shown that the passive walking, which is originally possible only on descending slopes, can be realized also on horizontal planes, if the needed energy is supplied to the joints to sustain the walking Such walking is called-passive dynamic walking (S. Collins, A. Ruina, M. Wisse, "A Three Dimensional Passive-Dynamic Walking Robot With Two Legs and Knees," Int. J. Robotics Research, Vol. 20, No. 7, pp. 607-615, July 2001).

An example of passive-dynamic walking is presented in M. Wisse, D. G. E. Hobbelen, A. L. Schwab, "Adding an Upper Body to Passive Dynamic Walking Robots by Means of a Bisecting Hip Mechanism," IEEE Trans. Rob., Vol. 23, No. 1, pp. 112-123, February 2007, where knees are equipped with locking mechanism, ankles are fixed, and toes have circular sole shape. Sustained walking on a horizontal plane is realized in such a way that at the instant when a support leg becomes a swing leg, the knee of the swing leg is unlocked and the hip is for a short duration powered with a torque, so that the swing leg kicks forward. A drawback of the proposed method is that the free motion of a swing leg cannot be achieved with a servomotor and gears unless a designated clutch mechanism to separate the joint from the drive unit is used. Without a clutch mechanism the motor and the joint are continually coupled and the motor must actively follow the motion of a leg, which increases the total energy consumption.

Muscle type actuators are beneficial in the sense that they allow free motion of a swing leg, therefore, McKibben actuators are used in M. Wisse, D. G. E. Hobbelen, A. L. Schwab, "Adding an Upper Body to Passive Dynamic Walking Robots by Means of a Bisecting Hip Mechanism," IEEE Trans. Rob., vol. 23, no. 1, pp. 112-123, Feb. 2007, p. 118, FIG. 9. By using a pneumatic artificial muscle, a swing leg can freely move when muscles are not pressurized, but the control of a pneumatic muscle itself is highly nonlinear and suffers from a dead time in the response, therefore, stable walking and good performance is difficult to achieve. Another disadvantage of the pneumatic muscles and other artificial muscles is that they require energy source in a form of compressed gas, heat, or chemical energy, which are difficult to provide, store, and control, and therefore are in total the cause for poor performance of a robot.

BRIEF SUMMARY OF THE INVENTION

The present invention provides a simple drive unit for legged robots that enables passive walking during descending a shallow slope (motors and joints are decoupled), passive-dynamic walking on a horizontal or slightly inclined up or down slopes (the energy is supplied only when needed), and active walking on a steep slope, uneven surfaces or on stairways (motors and joints are continuously coupled) without using any additional mechanical means or switching equipment for transition between the modes. The three modes of walking are realized only by control of the drive motor, which is a part of the invented drive unit for the legged robots.

The drive unit of the present invention is composed of a motor with shaft to which two or more flexible linking members being wires, strings, wire ropes, strands, sutures or any other flexible materials with high tensile strength are with one end attached at the center of rotation of the shaft and with the other end to a motion element. Fixture of the linking members to a motion element is at a distance 2A apart. The unit converts rotational torque of the motor into a pulling force on the motion element by twisting the flexible linking members on each other.

The objective of the present invention is to utilize the above described drive unit to power at least one of the joints being hip, knee or ankle of a legged robot. The drive unit of the present invention is equipped with means to detect at least one of rotational angles, pulling forces or rotational torques and with means to control the rotational angle, pulling force, or torque. The benefit of the present invention is a light-weight, simple structure and low-cost drive unit for three modes of walking Transition between the walking modes is realized without using any additional physical means. A passive walking is realized by controlling the motor shaft's rotational angle in to a position where flexible linking members are unwound and thus decouple the driving motor from the robot's joint. A passive-dynamic walk is realized by applying driving torque on the motor shaft and consequently to the robot's joint during a part of the walking step cycle. An active walk is realized by continuously coupled motor and joint through the flexible linking members of the drive unit providing torque to continuously control the joint. The present invention thus provides a drive unit and a control method thereof, which enable choice and smooth transition between the three modes of walking for any type of legged robots. Utilization of any of the three modes of walking is realized only by control of the torque and/or position of the driving motor without any additional physical means. A smooth and swift transition between the walking modes is achieved by using the invented drive unit.

The benefits of the present invention are reduced energy consumption during walking, increased safety in the case of robot and human contact or in robot's tumbling by unwinding of the flexible linking members and thus generating a free state in the robot's joints and so reducing impact forces during the contact.

BRIEF DESCRIPTION OF THE DRAWINGS

The accompanying drawings show embodiments of the invention of which

DETAILED DESCRIPTION OF THE INVENTION

Figure 1:
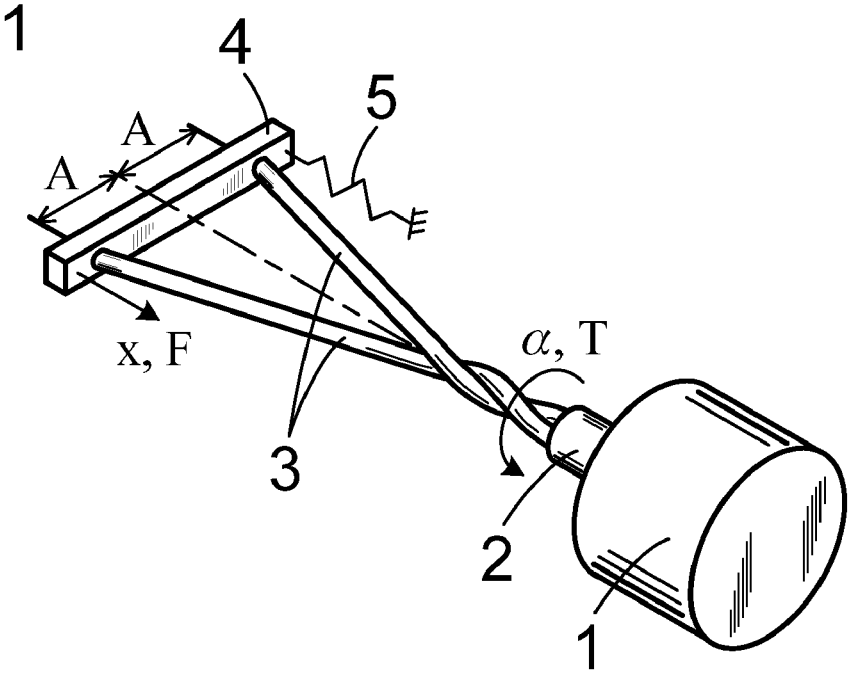
FIG. 1 is a schematic view of a drive unit for legged robots in accordance with the invention.

In the present invention at least one of the joints of a legged robot is powered by a drive unit shown in FIG. 1. The drive unit is composed of a drive motor 1 with rotational shaft 2 to which at least two flexible linking members 3 being wires, strings, ropes, wire ropes, threads, strands, sutures or other flexible elements with high tensile strength, high compliance, and high fatigue resistance are connected. One end of the flexible linking members 3 is attached to the rotational shaft 2 at its center of rotation, and the other ends are attached equidistantly at a distance A from the rotational axis of the rotational shaft 2 onto a motion element 4. The motion element 4 is primarily movable in the direction x so that the relative distance between the motor shaft 2 and the motion element 4 decreases when the shaft 2 is rotated in the direction $\alpha$ and the flexible linking members 3 twist on each other. When the shaft 2 rotates back to its initial position the flexible linking members 3 untwist and a force of a spring 5, gravity or other means are applied to the motion element 4 to return it to its initial position. The motion element 4 in the present invention is part a of robot's link or is mechanically connected to a robot's link and thus with the drive unit of present invention a rotational torque is generated in the robot's joint.

For practical design applications it is important to achieve sufficient stroke in a small space. The design parameters, namely the length of the flexible linking members L, equivalent or actual cross-section radius of the flexible linking members R, distance from the rotational element's rotational axis to the connecting points of the flexible linking members on the motion element A are introduced as variables. The relation between the rotational angle $\alpha$ (in radians) and the linear displacement x for the case with two flexible linking elements can be calculated by the following equation.

$$x = \sqrt{L^2 - A^2} - \sqrt{L^2 - (A+R\alpha)^2}$$

The relation between the pulling force F and rotational torque T can be calculated by the following equation.

$$F = \frac{\sqrt{L^2 - (A+R\alpha)^2}}{R(A+R\alpha)} T$$

The maximum achievable rotation angle $\alpha_{max}$ and the maximum motion range $x_{max}$ are specified by the following two equations.

$$\alpha_{max} = \frac{\pi L - \pi A \sqrt{4+\pi^2}}{R\sqrt{4+\pi^2}}$$

$$x_{max} = \sqrt{L^2 - A^2} - \frac{2L}{\sqrt{4+\pi^2}}$$

By using the above equations in applications of the present invention, the most suitable design can be obtained for given requirements. A condition to achieve high pulling force is R<<L, R<<A, which means that thin flexible linking elements provide higher pulling force. Thin flexible linking elements are prone to tear; therefore, it is beneficial to use materials with high tensile strength, high bending compliance, and resistance to wear, e.g. carbon fibers, carbon fibers composite material, high tensile strength resin fibers, metal rope wires or other suitable materials.

Figure 2:
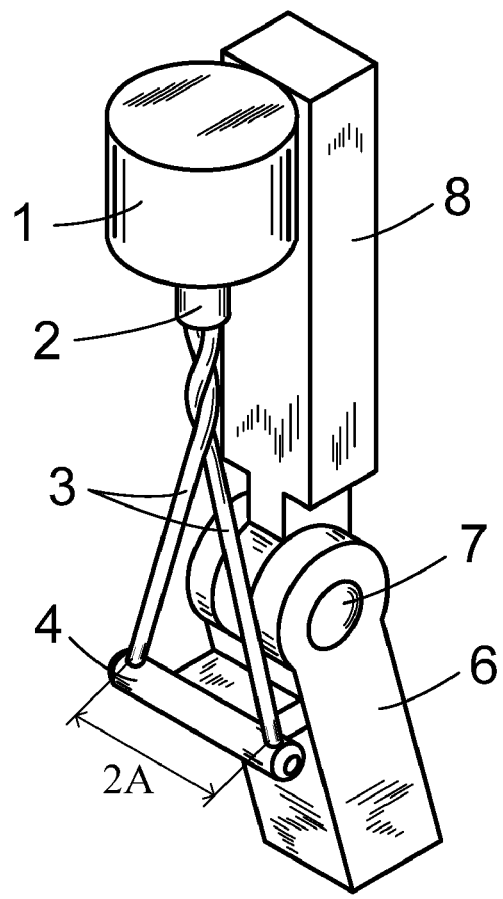
FIG. 2 is a view of an assembly where a pivotal joint of a robot is powered by the invented device.

The drive unit of the present invention is used to power a joint of a legged robot shown in FIG. 2. A drive motor 1 is fixed to robot's link 8, which is a robot's trunk in the case when joint 7 is a hip joint, and at least two flexible linking members 3 are with one ends fixed to the motor shaft 2 at its rotational center and with other ends to a motion element 4. The flexible members' fixture positions are at a distance 2A apart from each other. The motion element 4 is elastically or rigidly coupled to a robot leg's link 6. The function of elastically coupled motion element 4 to a robot's link 6 is to protect the strings from tear in the case of shock load and/or to be used to sense a pulling force in the flexible linking members.

When a motor 1 is powered, a torque generated on the motor's rotational shaft 2 is transformed by twisting of the flexible linking members 3 on each other into a pulling force. The pulling force is transmitted to the motion element 4 and thus onto the robot leg's link 6 and so produces a torque around the axis of the joint 7.

The benefit of the present invention is that coupling and decoupling of the motor 1 and the joint 7 is achieved simply by control of the rotational angle and/or rotational torque on the rotational shaft 2 of the drive motor 1. When the rotational angle of the rotational shaft is controlled into a position where flexible linking elements 3 are unwound, the motor 1 and the joint 7 are decoupled and the joint 7 can freely move over its whole motion range. That is, the motor and the joint of a legged robot are without any additional physical means easily decoupled.

By using means to detect a rotational angle α of the rotational shaft 2 and use a control unit with appropriately programmed computer to power the drive motor 1, the rotational angle of rotational shaft 2 can be controlled to achieve powered or free state of joint 7. Moreover, detection of rotational angle of joint 7, detection of pulling force of the flexible linking members by using detection means added to the motion element 4 (e.g. load cell etc.) can be used to the control the joint's 7 rotation angle and/or generated torque in the joint 7.

Figure 3:
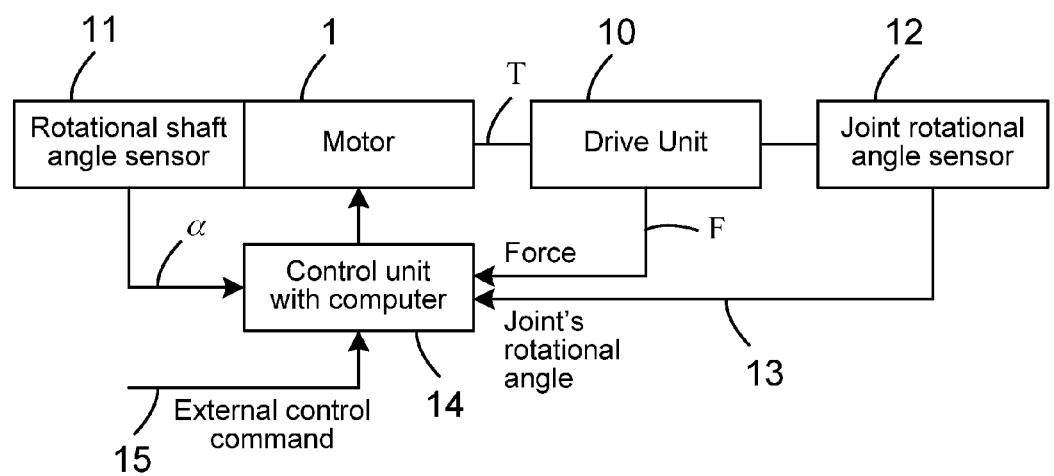
FIG. 3 is a block diagram of control system to control the invented drive unit.

A control system to provide control by the present invention is shown by a block diagram in FIG. 3. Rotational angle α of the rotational shaft 2 of a drive motor 1 is detected by a rotational shaft angle sensor 11, a joint's rotational angle 13 is detected by a joint rotational angle sensor 12, and the pulling force F that is generated in the drive unit of present invention 10 is detected by a sensor mounted on a motion element 4. The signals are led to a control unit 14 with embodied computer that is programmed to control position of the motor's rotational shaft 2, which is a rotational angle α and/or a rotational torque T generated in the drive motor 1 according to an external command 15 or in accordance to internally preprogrammed algorithm.

Figure 4:
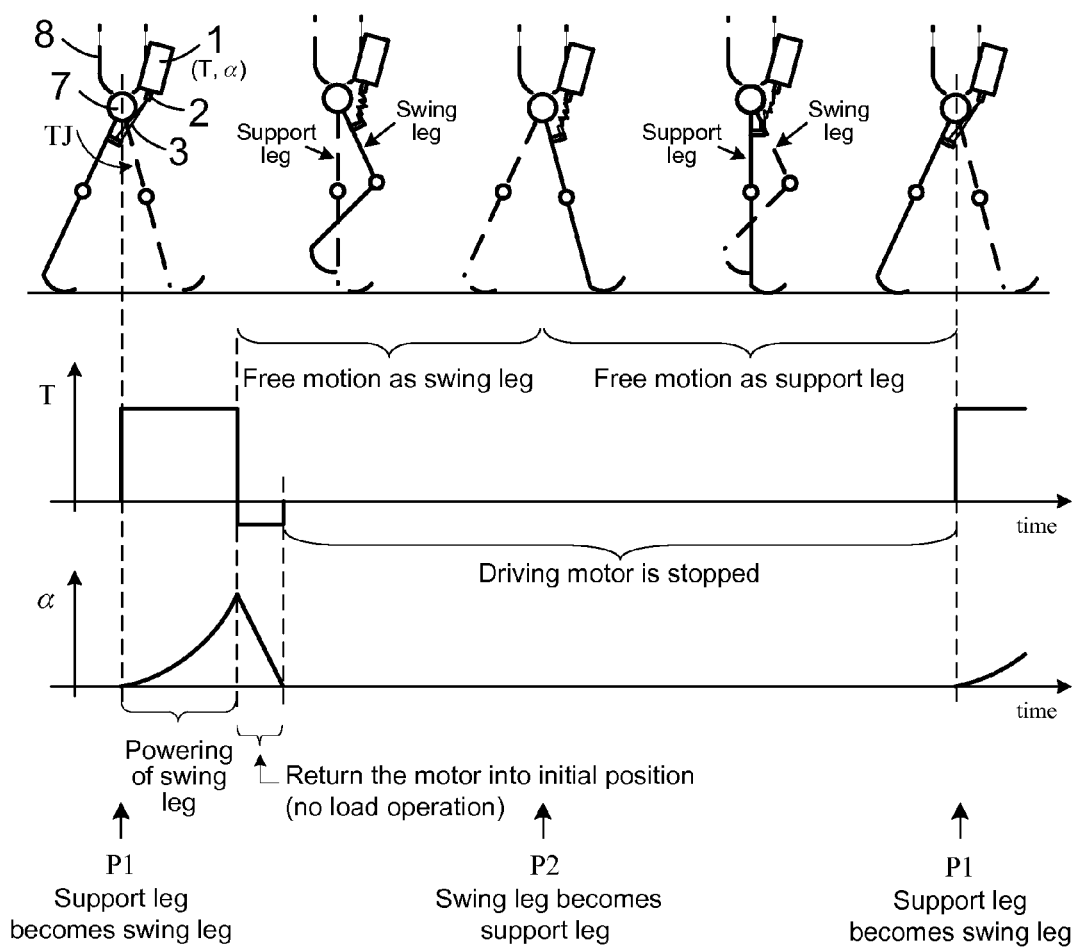
FIG. 4 is a schematic representation of a control method to achieve passive dynamic walk by using the invention.

An example of the invention embodiment and a control method thereof is schematically presented in FIG. 4. The drive unit of present invention is attached to a trunk 8 of a legged robot. A rotational torque T generated on a rotational shaft 2 by the drive motor 1 is by flexible linking members 3 transformed into a rotational torque TJ around the axis of the robot's hip joint 7. By controlling the rotational angle α of the rotational shaft 2 and/or generated torque T in the drive motor, it is possible to smoothly and instantly decouple and couple the drive motor 1 and the robot's joint 7, as it is needed for a required robot's walking mode or environment influence.

In the present example of FIG. 4 the rotational torque T is initiated at the time instant P1, that is at the time when a support leg becomes a swing leg. The instant can be determined by detecting a contact between the robot's leg and the ground by using proximity sensors or switches or other contact detecting means. The generated torque TJ in the robot's joint 7 powers the swing leg to accelerate forward, however, after short period, which is controlled by preprogrammed conditions in the control unit based on the signals from the joint's rotational angle sensor or motor's rotational shaft angle sensor, the rotational shaft 2 of the drive motor 1 is controlled back to its initial position with the goal to decouple the drive motor 1 and the robot's joint 7. The benefit of this invented control algorithm is that the remaining motion of the leg as swing leg and support leg is free and decoupled from the motor until the successive point in time P1 is detected. The motion of the leg is therefore primarily ruled by inertia and gravity, and thus the motor is stopped and does not consume energy during the free motion of the leg. An exception would be when control of the leg is needed due to external disturbances or other influences. The two important benefits of the invention are reduced energy consumption, and natural appearance of the walking A quiet operation of the invented device is also a benefit that is important when robots are in vicinity of people and thus do not produce disturbing mechanical noise.

The invented control method can be applied identically or with some adaptations to drive units in other joints of a legged robot Timings and durations of the applied torques need to be adjusted for each drive unit, joint and leg separately to achieve desired results.

The example of embodiment of invention and control thereof shown in FIG. 4 is a simple demonstration of the benefits of the invention and does not provide full control of the posture of the robot's trunk 8 during the walking due to a lack of powered degrees of freedom. When torque TJ is applied to the robot's swing leg, the same torque causes robot's trunk 8 to lean forward. To simultaneously control the body's posture and to power the hip joints for walk, two drive units needed to be attached to each hip joint 7: one in front of the robot's trunk 8 and one in the back of the robot's trunk 8, as shown in FIG. 5.

Figure 5:
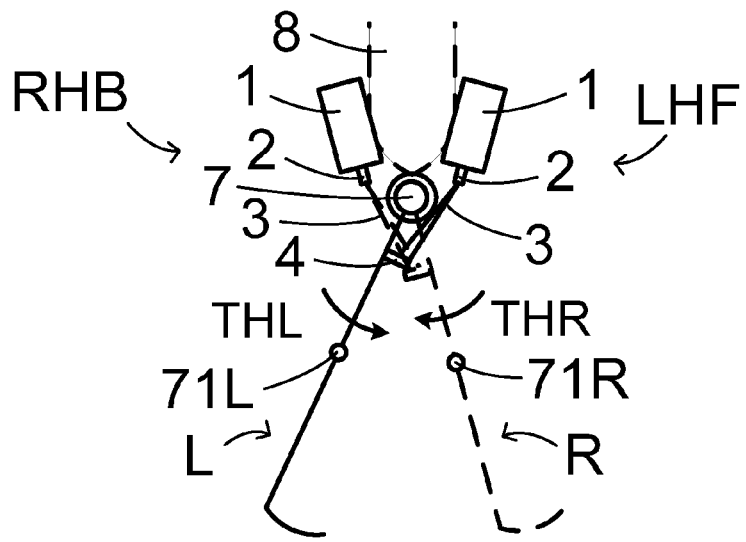
FIG. 5 is a schematic view of invention where legged robot's hip joints are powered by the invented drive unit.

An example of embodiment schematically presented in FIG. 5 has two invented drive units attached to each hip joint 7. At the instant when support leg L becomes a swing leg, a torque THL is applied to the swing leg L by a drive unit LHF, which is attached in the front of a robot's trunk 8 to power the hip joint 7 of leg L. To counterbalance this torque and to allow active control of the posture of the robot's trunk 8, equivalent or slightly different torque THR is applied to the hip joint 7 of the support leg R by using a drive unit RHB, which is attached in the back of the robot's trunk 5 to power the hip joint 7 of leg R. The difference of the two torques govern the posture of the robot's trunk, while the torque applied to the swing leg THL controls the step width, and the torque applied on the back of the support leg THR gives a push forward to the robot's trunk 8 and thus controls the walking speed. The generated torques in the hips also have desired effect to lock the knee joint 71R on the support leg R and to unlock the knee joint 71L on the swing leg L. By using two invented drive units in each hip joint, a posture of the trunk 8 of a biped robot, a step width, and a walking speed can be simultaneously and effectively controlled while keeping the energy consumption of walking at its minimum. An embodiment of the same example with driving motors 1 attached to the legs and motion elements 4 attached to the robot's trunk 8 is another way to utilize the invented drive unit.

Figure 6:
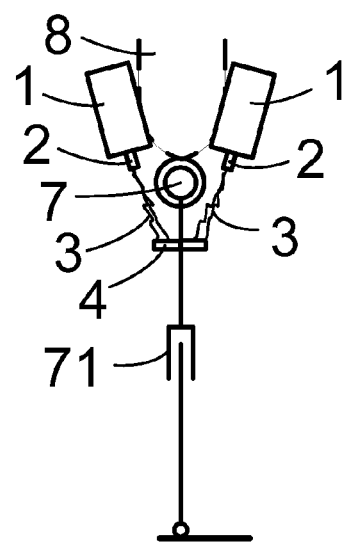
FIG. 6 is a schematic view of another embodiment of the invention where legged robot's hip joints are powered by the invented drive unit and knee joints are prismatic joints.

Another embodiment with hip joints powered by the invented drive unit and having knee joints 71 embodied as slider joints is shown in FIG. 6. In comparison to the embodiment shown in FIG. 5, this embodiment has higher robustness and stability on an uneven terrain because it allows overstepping the obstacles that are lower than the contraction range of the knee joint 71.

Figure 7:
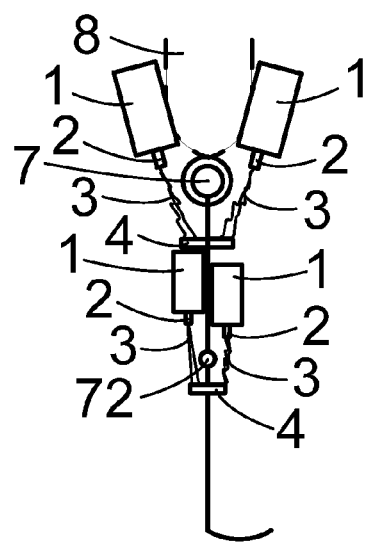
FIG. 7 is a schematic view of embodiment of invention where legged robot's hip joints and knee joints are powered by the invented drive unit.

An example of the invention embodiment with hip and knee joints powered is schematically presented in FIG. 7. The benefit of this embodiment is that the knee joints 72 are powered by the invented drive unit and by the control thereof a torque is applied to the knees 72 when needed and thus robustness and stability of walking is highly improved especially on an uneven terrain or when negotiating moderate slopes or low steps up or down. Another benefit is that by the invented drive unit and control thereof position of the rotational shaft 2 can be controlled in such way that the flexible linking members 3 are un-twisted so that the knee joint 72 can be set to rotate freely and the knee joint motion can be realized without any energy consumption. A transition from active walk to passive walk and vice versa is realized smoothly and instantaneously by the invented drive unit and control method thereof without using any additional mechanical means.

Figure 8:
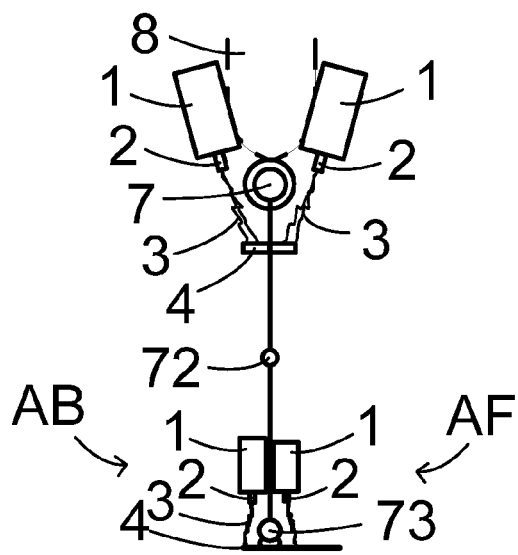
FIG. 8 is a schematic view of embodiment of invention where legged robot's hip joints and ankle joints are powered by the invented drive unit.

An example of the invention embodiment with hip joints and ankle joints powered is schematically presented in FIG. 8. In prior art published in references, stiff joints or a simple mechanisms with latches and springs are used in ankles of a passive-dynamic walking robots to improve stability and to achieve sustained walk on flat or slightly uneven surfaces (for example, refer to M. Wisse, D. G. E. Hobbelen, A. L. Schwab, "Adding an Upper Body to Passive Dynamic Walking Robots by Means of a Bisecting Hip Mechanism," IEEE Trans. Rob., Vol. 23, No. 1, pp. 112-123, February 2007; S. Collins, A. Ruina, R. Tedrake, M. Wisse, "Efficient Bipedal Robots Based on Passive Dynamic Walkers," Science, Vol. 307, pp. 1082-1085, February 2005). Such non-ideal solutions were used in prior art due to lack of drive units that allow decoupling of drive motor and joint without added weight, increased complexity, and increase energy consumption. The drive unit of present invention provides ideal solution for ankle joints drive units. Without added weight, increased complexity, or increased energy consumption an ankle of a legged robot can be powered or set free smoothly and instantaneously by using two invented drive units attached to a robot's leg at ankle joint, namely unit AF on the front side of an ankle joint 73 and unit AB on the back side of the ankle joint 73. Control of a torque in the ankle joint 73 is achieved by toque control of the respective drive motor 1 and the joint is set free by un-twisting the flexible linking members 3. Active torque control in ankle joint is beneficial to achieve stability in a stand still posture of a robot and to reduce energy loss at the impact of a swing leg with the ground at the end of a step cycle by applying a push-up torque in the ankle joint 73, which is realized by momentarily applied torque to a drive unit AB on the back of the ankle joint 73. The presented embodiment in FIG. 8 allows robust, stable, and sustained passive dynamic walking by the method of torque control in hip joints to govern the step width and walk speed while torque in ankle joints is used to generate kick-ups and in this way both hip and ankle supply needed energy for sustained walk on a horizontal plane or on moderate slope up. Passive walk can also be easily achieved by the same embodiment by un-twisting the respective flexible linking members and thus decouple drive motors and the joints.

Figure 9:
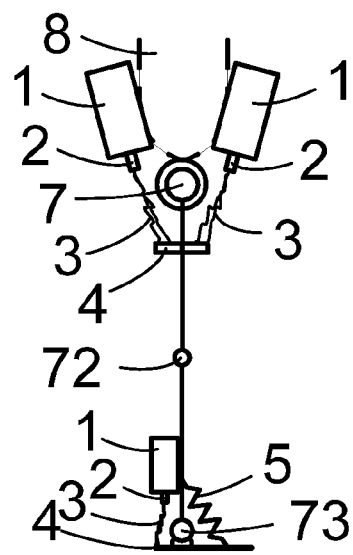
FIG. 9 is a schematic view of embodiment of invention where legged robot's ankle joints are powered by combination of the invented drive unit and spring.

Another example of the invention embodiment with hip joints and ankle joints powered is schematically presented in FIG. 9. In this embodiment the drive unit in front side of the ankle joint 73 is replaced by a spring 5. Typical for a biped walk is that there is not much need to actively control torque to rise the foot, therefore, a spring 5 is implemented to rise the foot in the presented embodiment. Benefit of this embodiment is reduced weight at the ankle joint 73 by replacement of the drive unit with a lightweight spring to power the ankle.

Figure 10:
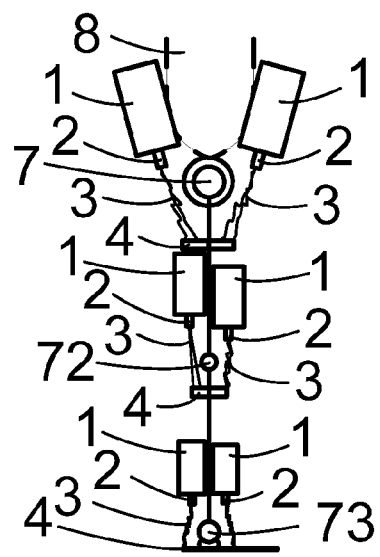
FIG. 10 is a schematic view of embodiment of invention where legged robot's hip joints, knee joints, and ankle joints are powered by the invented drive unit.

An example of the invention embodiment with all joints of a robot's leg powered is schematically presented in FIG. 10. The embodiment presented in FIG. 10 has drive units according to present invention assembled to each joint of the robot's leg and with the control thereof a torque in each joint can be controlled or when needed, the joint can be set free. This embodiment therefore provides means to smoothly and swiftly apply various combinations of walking modes presented above without any additional mechanical means and thus allows choosing between passive walking, passive-dynamic walking, and active walking according to the conditions surrounding the robot. With this embodiment the robot can climb and descend stairs in active walk mode, descend a shallow slope in passive walk mode, and walk on all other surfaces in passive-dynamic mode, so that the energy consumption is always minimized.

Another important benefit of present invention is that in the case of a robot tumbling or hitting surrounding objects, the joints can be instantaneously set free and thus the impact forces can be significantly reduced. This is important for safety especially in a society where robots are expected to cooperate and help humans.

What is claimed is:

1. A drive unit comprising
   (a) at least two flexible linking members, a driving motor with a rotational shaft to which said flexible linking members have ends connected at the center of rotation of said rotational shaft, a motion element which is at a distance away from said driving motor in the direction of a rotational axis of said rotational shaft and is primarily movable in the direction of said rotational axis of said rotational shaft and is supported by means which prevent rotation around said rotational axis of said rotational shaft and to which said flexible linking members have other ends connected at locations that are spaced equally from said rotational axis of said rotational shaft, allowing said flexible linking members to twist on each other or untwist depending on the direction of rotation of said rotational shaft causing the distance between said rotational shaft and said motion element to vary and thus convert a rotational motion of said rotational shaft into a motion of said motion element primarily in the direction of said rotational axis of said rotational shaft and convert a rotational torque of said drive motor into a pulling force on said motion element primarily in the direction of said rotational axis of said rotational shaft to power at least one joint of leg mechanism of a legged robot,
   (b) means detecting at least one of rotational angle of said rotational shaft, rotational angle of said joint of a legged robot, rotational torque of said drive motor, pulling force on said motion element, and means controlling at least one of said rotational angle of rotational shaft, rotational torque of said drive motor to control at least one joint of a leg mechanism of a legged robot,
   (c) means controlling said rotational shaft of said drive motor into a position where said flexible members are untwisted to decouple said rotational shaft of said drive motor from said joint of said legged robot for the purpose to achieve passive walking, means controlling said drive motor to generate a rotational torque on said rotational shaft and by said flexible linking members twisting on each other generate a pulling force on said motion element during part of a walking step cycle of said legged robot for the purpose to achieve a passive-dynamic walking, and means controlling said drive motor to generate a rotational torque on said rotational shaft and by said flexible linking members twisting on each other generate a pulling force on said motion element during the whole walking step cycle of said legged robot for the purpose to achieve active walking.

* * * * *